United States Patent [19]

Tanaka et al.

[11] Patent Number: 4,977,508
[45] Date of Patent: Dec. 11, 1990

[54] INTERNAL COMBUSTION ENGINE EQUIPPED WITH A TORQUE CONTROLLER

[75] Inventors: Naoyuki Tanaka, Abiko; Yozo Nakamura, Ibaraki; Akira Arai, Ibaraki; Mitsuru Nakamura, Ibaraki; Tsunehiro Endo, Hitachiota; Yuzo Kadomukai, Ibaraki, all of Japan

[73] Assignee: Hitachi, Ltd., Tokyo, Japan

[21] Appl. No.: 929,912

[22] Filed: Nov. 13, 1986

[30] Foreign Application Priority Data

Jun. 27, 1986 [JP] Japan ................................ 61-149524

[51] Int. Cl.⁵ .................... F02D 29/06; F02B 75/06
[52] U.S. Cl. ...................... 364/431.08; 364/431.03; 123/419; 123/436
[58] Field of Search .......... 364/424.1, 431.03, 431.08; 123/419, 430

[56] References Cited

U.S. PATENT DOCUMENTS

| 4,357,662 | 11/1982 | Schira et al. | 123/419 |
| 4,489,690 | 12/1984 | Burkel et al. | 123/419 |

FOREIGN PATENT DOCUMENTS

| 0211542 | 9/1983 | Japan | 123/436 |
| 0217742 | 12/1983 | Japan | 123/436 |
| 0122754 | 7/1984 | Japan | 123/430 |

Primary Examiner—Thomas G. Black
Assistant Examiner—V. N. Trans
Attorney, Agent, or Firm—Antonelli, Terry, Stout & Kraus

[57] ABSTRACT

An engine load torque controller detects the engine output torque variation as an engine speed variation and controls the load torque of an auxiliary machinary driven by the engine basing on the detected speed variation, thereby diminishing the vibration of the engine.

15 Claims, 9 Drawing Sheets

$$Vx(k) = \sum_{i=1}^{N} a_i \Delta Vx(k)_i$$

FOR OBTAINING THE SIMPLE MEAN VALUE $$a_i = \frac{1}{N}$$

50 --- $\boxed{a_i \triangleright}$ --- MULTIPLIER ($\Delta Vx(k)_i \times a_i$)

51 --- $\boxed{T}$ --- DELAY ELEMENT (ENGINE ONE ROTATION PERIOD)

52 --- $\Sigma$ --- ADDER ($\sum_i \Delta Vx(k)_i \cdot a_i$)

INTERNAL COMBUSTION ENGINE EQUIPPED WITH A TORQUE CONTROLLER

BACKGROUND OF THE INVENTION

This invention relates to an internal combustion engine equipped with a torque controller.

In the field of internal combustion engine, there has been known that the varying cylinder interior pressure due to compression of intake mixture and expansion of combustion gas and the varying connecting rod angle with the crankshaft cause a variation in "gas torque", and the varying rotational inertia force causes a variation in the inertia torque. Such torque variations propagated to various devices driven by the engine create torsional vibrations on these devices, resulting in a degraded performance or a damage to the devices, and therefore the torque variation of the engine must be reduced sufficiently. The torque variation has a reaction which is propagated through the cylinder block to the engine supporting member, which then vibrates to create an increased noise, and therefore such a reactional vibration must also be reduced.

There has been a proposal for coping with the above-mentioned matter, as described in Japanese Pat. Unexamined Publication No. 58-185937, in which a counter torque is produced on the crankshaft synchronously at an increase in the torque variation derived from the internal combustion engine.

However, the conventional technique has encountered the following difficulty in producing a counter load torque in close synchronism with the varying torque produced by the internal combustion engine. Namely, an extremely high-speed operation is required for a series of processes for detecting a quick varying torque, calculating the value of the counter load torque which cancels the detected torque variation and causing the load torque to vary by some means, and it has been difficult for the existing control technique to implement the above-mentioned tight operation.

SUMMARY OF THE INVENTION

An object of this invention is to provide an internal combustion engine equipped with a load torque controller which virtually prevents the occurrence of vibration caused by the torque variation of the internal combustion engine.

In order to achieve the above objective, the inventive internal combustion engine having a main power transmission system and an auxiliary machinary drive transmission system is equipped with a load torque controller for controlling the load torque to be absorbed by the auxiliary machinary with the intention of eliminating or minimizing the difference (differential torque) between the varying torque created by the engine and the load torque absorbed by the auxiliary machinary in the whole range of the crank angle, the load torque being controlled based on the differential torque information collected in at least one previous operating cycle of the engine.

Figure 12:
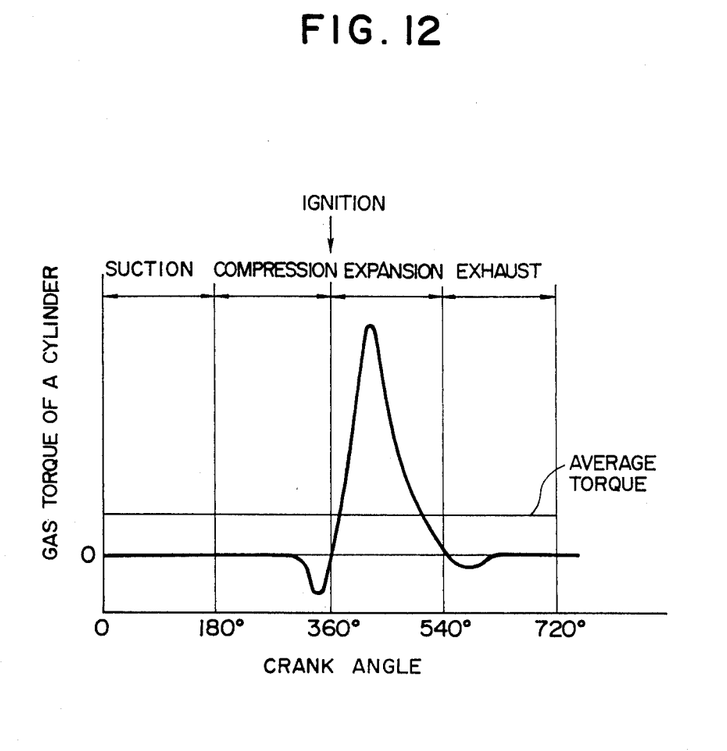
FIG. 12 is a graph showing an example of gas torque variation in an internal combustion engine.

As an example of the torque variation curve of internal combustion engines, FIG. 12 shows the gas torque variation of one cylinder of a Diesel engine The 4 stroke cycle engine operates in the four strokes of suction, compression, expansion and exhaust in 720° (two revolutions) in terms of the crank angle (from henceforth this cycle shall be identified as an "engine cycle"), and there arises an extremely great torque variation in the expansion stroke especially immediately after ignition due to the combustion gas pressure. For a 4-cylinder engine, the same gas torque variation occurring four times in one engine cycle 180° of crank shaft apart from each other. Therefore, the resultant gas torque has a fundamental period of 180° in crank shaft angle. This is added by the inertia torque variation caused by the variation in the rotational inertia force to form a varying torque produced by an actual engine.

The output torque of the internal combustion engine varies sharply and in a complicated manner depending on the crank angle, and therefore it is difficult to vary the absorptive load torque for the auxiliary machinary in response to the varying engine torque on a real-time basis Seen from another viewpoint, when the engine runs at a constant speed, the difference between the varying torque and the load torque absorbed by the auxiliary machinary and the like (i.e., differential torque) is reflected by the rotational speed variation on the crankshaft. Namely, an increasing torque causes the rotational speed to rise, while a decreasing torque causes the speed to fall. Accordingly, by sensing the crankshaft speed variation by some means and controlling the load torque so that the speed variation diminishes, the differential torque is virtually eliminated and consequently the vibratory noise created by the engine supporting members caused by the reaction of torsional vibration induced by the engine torque variation will be resolved. This idea is embodied in the following manner.

In an internal combustion engine having a main power transmission system and an auxiliary machinary drive transmission system, the rotational speed variation on the crankshaft caused by the engine torque variation is detected, the load torque to be absorbed by the auxiliary machinary for nullifying the speed variation is calculated for each crank angle, and the load torque control is implemented on the basis of the calculated control value after one engine cycle (two crankshaft revolutions for a 4-cycle engine). In case the auxiliary machinary is an electric power generator (a.c. generator), the absorptive load torque can be controlled by changing the generator output current (load current). Since the change in the torque variation of the internal combustion engine is periodical, the dominant components of torque variation can be suppressed through the load control in which speed variations in a past few engine cycles are held and averaged for each crank angle, and more reliable control is accomplished. For multi-cylinder engines, e.g., a 4-cycle, 4-cylinder engine, if the combustion process is analogous torque variation will be identical among all cylinders, their torque variation patterns will coincide with a 180° phase difference of a crank shaft, and it becomes possible to use the overlapping patterns as periodic variation data for the control in the next period.

DESCRIPTION OF THE PREFERRED EMBODIMENTS

Figure 1:
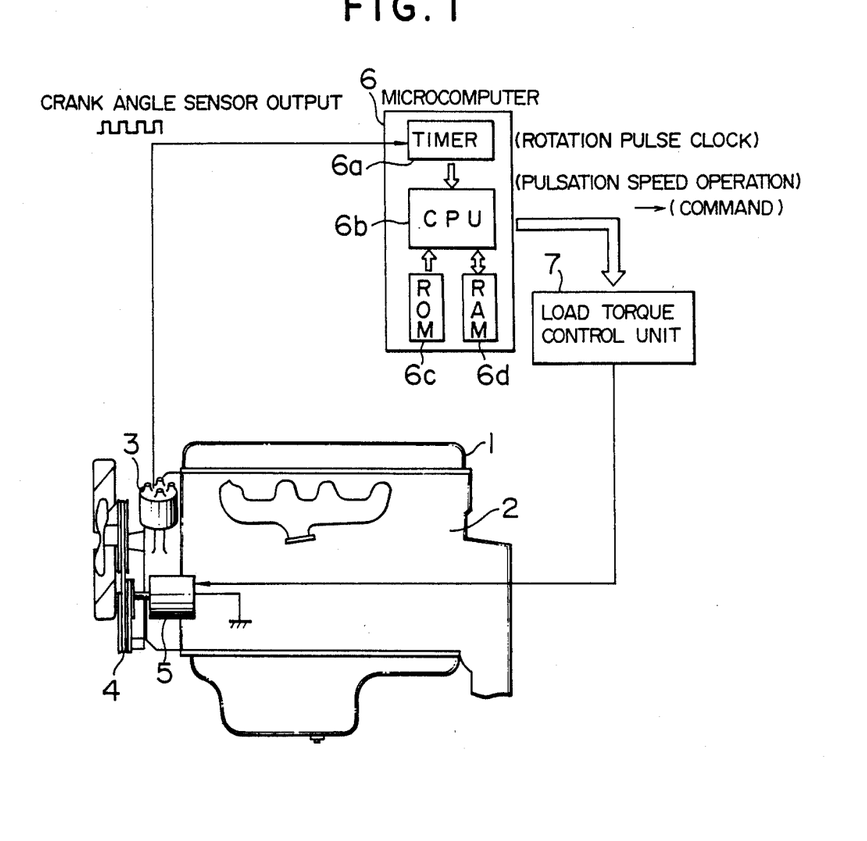
FIG. 1 is a schematic diagram showing the internal combustion engine and its load torque control circuit embodying the present invention.

FIG. 1 shows a first embodiment of this invention, in which an internal combustion engine 1 includes an engine unit 2, a distributor 3 incorporating a crank angle sensor, and an a.c. generator (ACG) 5 which is an auxiliary machinary fixed on the engine unit 2 and is driven by the engine unit 2 through an V shaped belt and crank pulleys 4. The crank angle sensor serves as a means for detecting the varying torque of the engine 1 by detecting the speed variation of the engine 1, and its output pulses are received by a microcomputer 6 which calculates the instantaneous engine speed variation and evaluates the load current of the generator 5 for minimizing the speed variation. After each engine cycle, the microcomputer 6 issues a command to a load torque control unit 7 which adjusts the load current of the generator 5 in response to the command These components in combination constitute an engine load torque control system.

Figure 2:
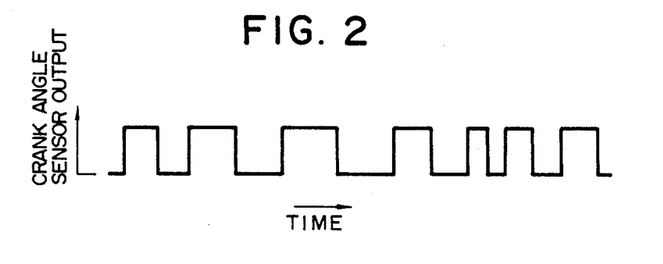
FIG. 2 is a waveform diagram showing the speed signal produced by the crank angle sensor.
Figure 3:
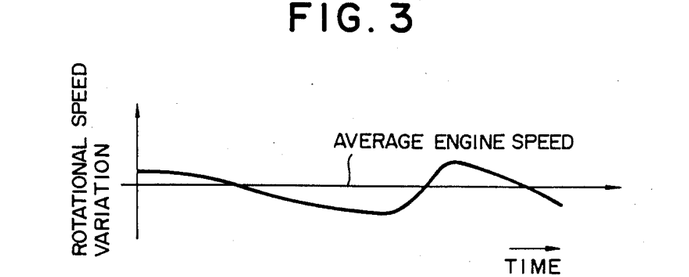
FIG. 3 is a graph showing the engine speed variation evaluated from the signal shown in FIG. 2.

FIG. 2 shows the pulse signal produced by the crank angle sensor The sensor output signal has its pulse width varied as shown by the fluctuation of the rotational speed of the crankshaft The microcomputer 6 operates on its timer 6a to measure the pulse width of the varying sensor output signal, calculates the instantaneous rotational speed by reciprocating the pulse width, and calculates the average engine speed for the period of engine cycle by counting sensor output pulses using a counter incorporated in the timer 6a. The difference between the instantaneous speed and average speed is calculated to evaluate the instantaneous speed variation. (See FIG. 3.)

Figure 4:
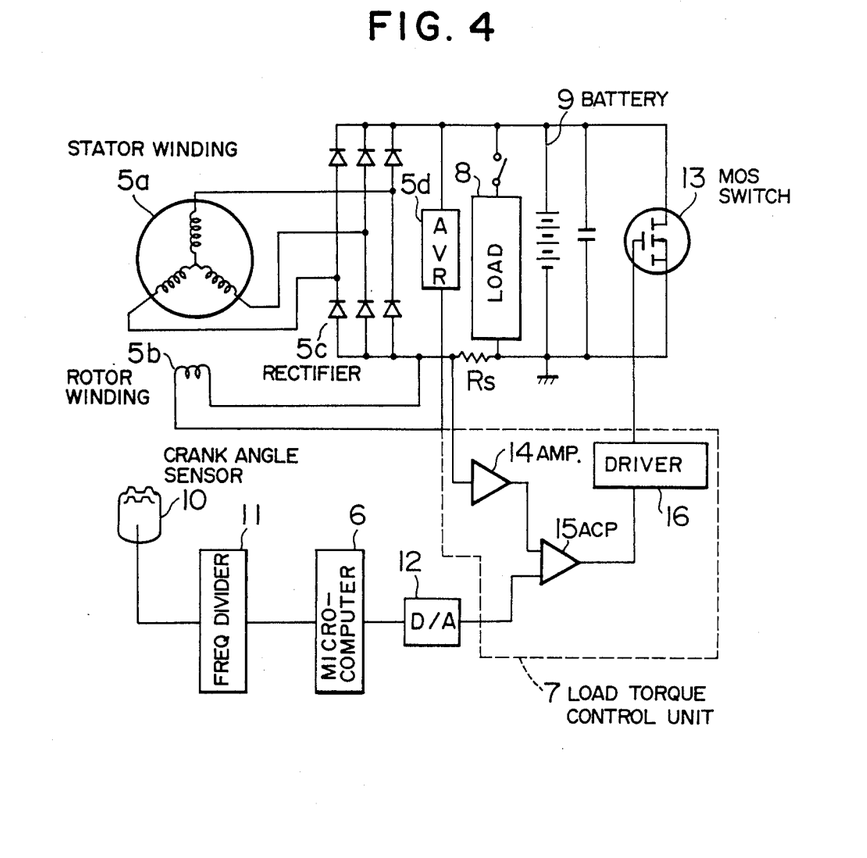
FIG. 4 is a schematic diagram of the load torque control system.

FIG. 4 shows a specific arrangement of the control circuit, the figure being intended to explain in more detail the qualities of the first embodiment. The a.c. generator (ACG) 5 consists of a stator winding 5a which produces a.c. power (3-phase output in this embodiment), a rotor winding 5b which supplies a magnetic field, a rectifier 5c made up of a diode bridge for rectifying the a.c. power to d.c. power, and an automatic voltage regulator (AVR) 5d which controls the d.c. output to a constant voltage. Rotation of the ACG rotor causes the rotor winding 5b to produce a rotational magnetic field, and a current induced on the stator winding 5a is fed through the rectifier 5c and supplied to the electric load 8 including an ignition coil and lamps etc, and to a battery 9. If the load is constant, the torque variation of the engine 1 is reflected by the crankshaft speed variation, which is detected by the crank angle sensor 10. The frequency of sensor output pulses is reduced to meet the minimum requirement for control by a frequency divider 11, and the pulses are fed to the microcomputer 6. The microcomputer 6 produces a command signal in the manner mentioned previously, and it is fed through a D/A converter 12 to the load torque control unit 7. The load torque control unit 7 has a driver 16, which turns on or off a MOS switch 13 connected in parallel to the load 8 and battery 9. A turn-on MOS switch 13 provides a by-pass of the load, resulting in an increased current flowing in the power circuit. Accordingly, by operating the driver 16 in pulse width modulation (PWM) mode or the like so as to change the duty cycle of the MOS switch 13, the load current of the generator can be controlled. Namely, the MOS switch 13 is given a duty cycle with a longer on-period so as to increase the load current and thus to increase the load torque in response to an increase in the engine speed, while a duty cycle with a shorter on-period is given so as to decrease the load current and thus to decrease the load torque, thereby counteracting the engine speed variation.

Figure 5:
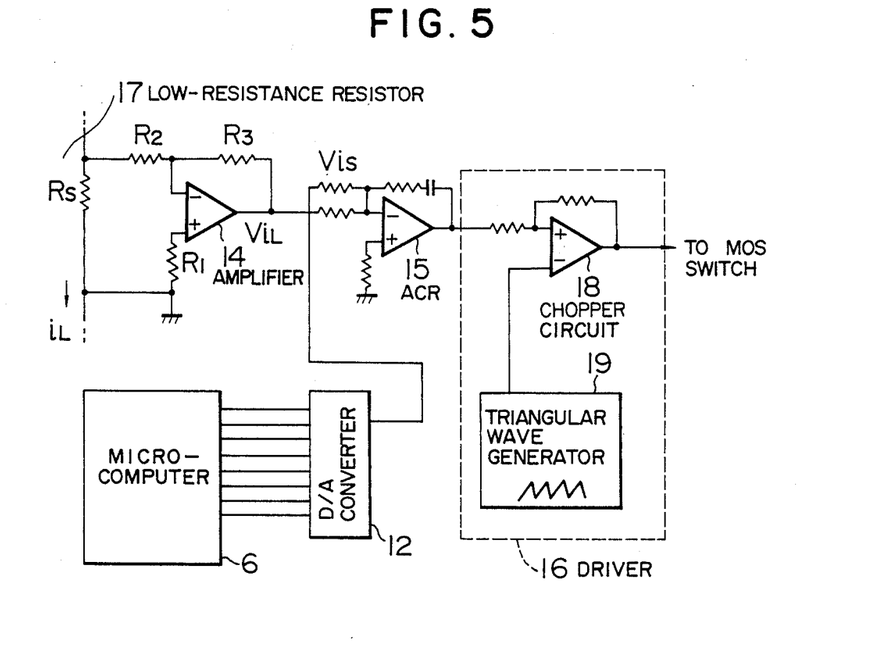
FIG. 5 is a schematic diagram of the load torque control unit in FIG. 4.
Figure 6:
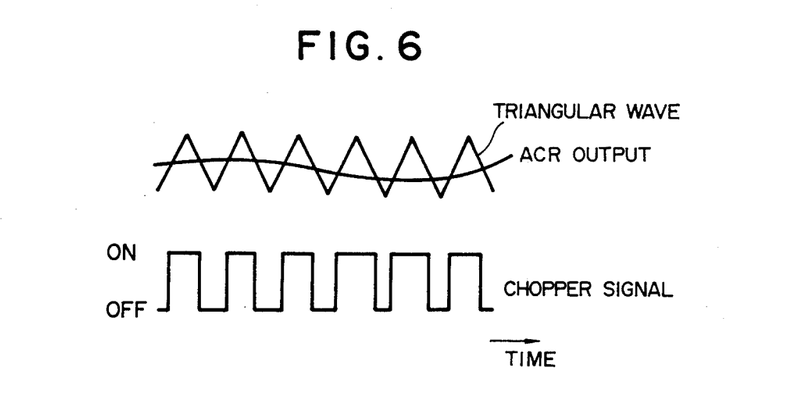
FIG. 6 is a waveform diagram showing the chopper signal used for the load current control.

FIG. 5 shows in detail the load torque control unit 7 and its periphery. A resistor 17 having a small resistance Rs is inserted in the power circuit so that the load current iL is detected as a voltage drop across the resistor 17. An amplifier 14 processes the voltage drop signal to produce a current signal ViL, and it is given to an automatic current regulator (ACR) 15. The ACR 15 forms a feedback loop for the entire power circuit so that the detected current value ViL is made equal to the current command value ViS issued by the microcomputer 6. A chopper circuit 18 receives the output of the ACR 15 and the output of a triangular wave generator 19 to operate the MOS switch 13 in PWM mode so that the load current iL is equal to the command of the microcomputer 6. (See FIG. 6.)

Figure 7:
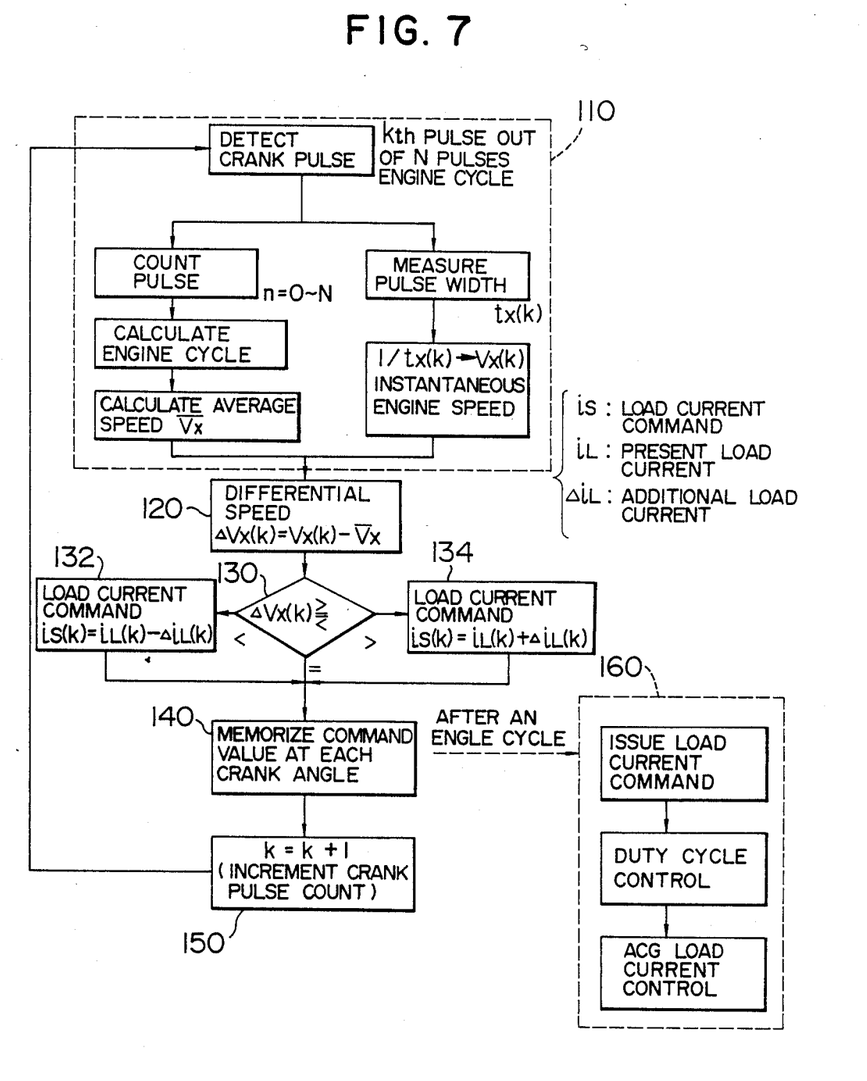
FIG. 7 is a flowchart showing the control operation of the torque control system.

FIG. 7 shows in flowchart the operation of the foregoing control circuit In the initial step 110, the microcomputer 6 receives a k-th pulse at a certain crank angle out of N pulses per engine cycle, measures the pulse interval tx(k) from the k−1 th pulse, calculates the rotational speed Vx(k) from the tx(k) at this crank angle, and calculates the average speed Vx in the past engine cycle by counting the k−N th to k−1 th pulses A differential speed $\Delta Vx(k) = Vx(k) - Vx$ is calculated in step 120.

The subsequent step 130 tests the polarity of the differential speed $\Delta Vx(k)$, and if $\Delta Vxk) < 0$, i.e., the instantaneous speed Vx(k) is lower than the average speed Vx, the following step 132 issues a load current command $i_{S(k)} = i_{L(k)} - \Delta i_{L(k)}$ so as to reduce the load current $i_{L(k)}$; if $\Delta Vx(k) > 0$, i.e., the instantaneous speed Vx(k) is higher than the average speed Vx, the following step 134 issues a load current command $i_{S(k)} = i_{L(k)} + \Delta i_{L(k)}$ so as to increase the load current; and if the instantaneous speed Vx(k) is equal to the average speed Vx, the load current is kept unchanged In the next step 140, the load current command $i_S$ at the k-th crank angle is memorized, the pulse count is incremented to k+1 in step 150, and the sequence returns to the beginning.

At every k-th step in all engine cycles, the previously memorized load current command at the respective k-th crank angle is fed to the driver 16 to control the duty cycle of the MOS switch 13, and the ACG load current is controlled. This procedure is shown in step 160.

Figure 8:
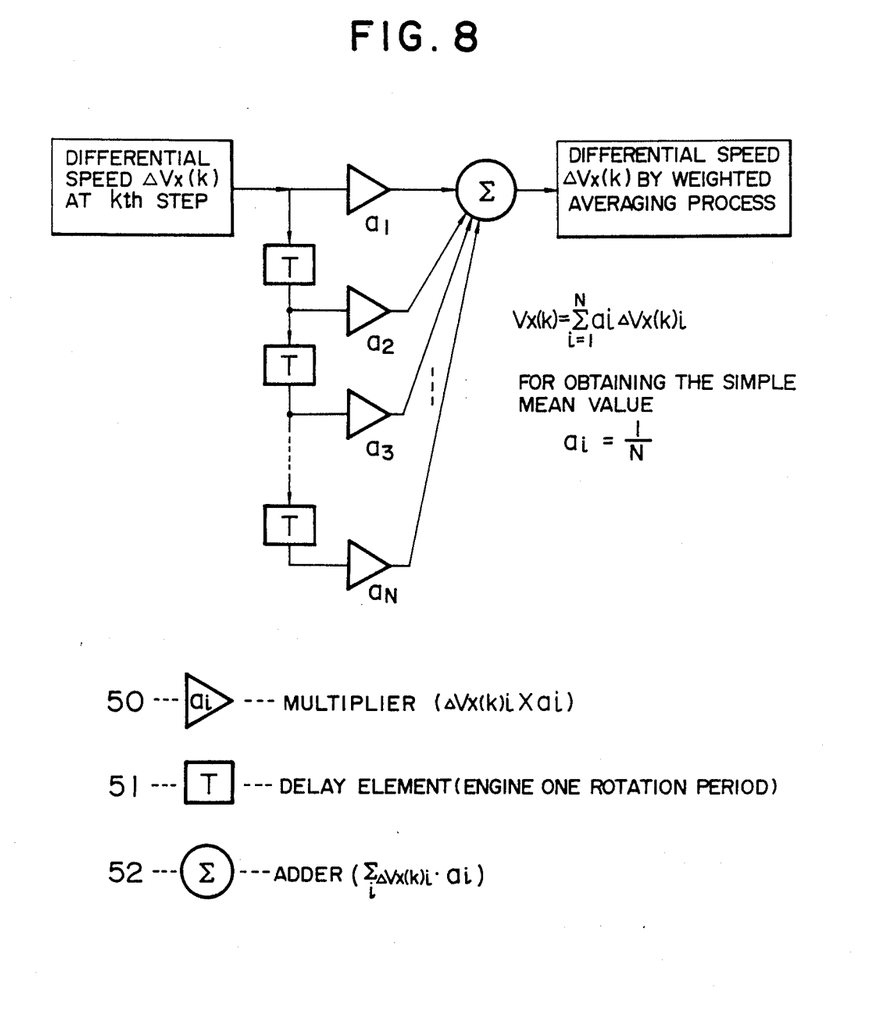
FIG. 8 is a block diagram of the digital filter employed when averaged speed data is used.

FIG. 8 shows the determination of the control value from speed variation information which is in this case based on speed data collected in previous engine cycles and averaged The weighted moving average for a differential speed $\Delta vx(k)$ at a crank angle k is calculated for a past few engine cycles as follows.

$$\Delta Vx(k) = \sum_{i=1}^{N} ai\, \Delta vx(k)i \qquad (1)$$

The above averaging process is accomplished using a linear non-cyclic digital filter as shown in FIG. 8. The filter receiving input data $\Delta Vx(k)$ consists of multipliers 50, 1-cycle delay elements 51 and an adder 52. With weighting factors ai being set as: $a1=a2=\ldots=an=1/N$, the equation (1) provides a simple mean value.

Since the speed variation of the crankshaft is periodical, the above averaging process minimizes the tendency of control instability even at the occurrence of an incident varying component and ensures the control of the dominant components of torque variation, whereby reliable control is achieved.

Figure 9:
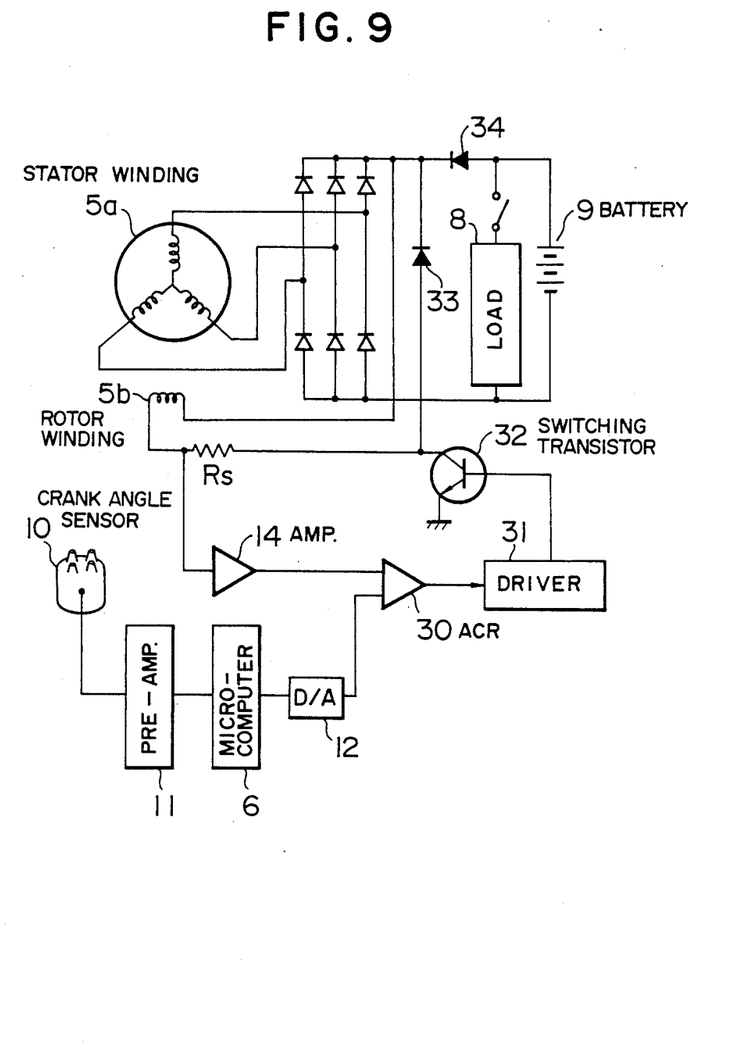
FIG. 9 is a schematic diagram showing the second embodiment of this invention.

FIG. 9 shows a second embodiment of this invention. This embodiment is intended to diminish the speed variation of the crankshaft by controlling the field current of the rotor winding, in contrast to the first embodiment of FIG. 4 where the generator load current is controlled. Namely, an increase in the field current results in a rising generator output voltage, and the generator 5 requires an increased drive torque. The microcomputer 6 calculates the necessary load torque from speed variation information of the previous engine cycle provided by the crank angle sensor 10, and the field current of the rotor winding 5b is controlled in accordance with the load current command. A conceivable control scheme is shown in FIG. 9, in which the field current flowing in the rotor winding 5b is detected and controlled by a field current regulator (ACR) 30 so that it is equal to the command of the microcomputer 6, with the output of the ACR 30 being fed through a driver 31 to the base of an emitter-grounded transistor 32 so that it is operated in switching mode. The on-state of the transistor 32 allows a field current to flow through the rotor winding 5b, while the off-state shuts off the field current. By changing the duty cycle of the transistor operation, the generator field current is controlled. A diode 33 is used as a feedback diode to feed a current caused by an excessive voltage back to the power source, and a diode 34 is to protect the electric load 8 from the fluctuation of the generator output voltage caused by the field current control.

Figure 10:
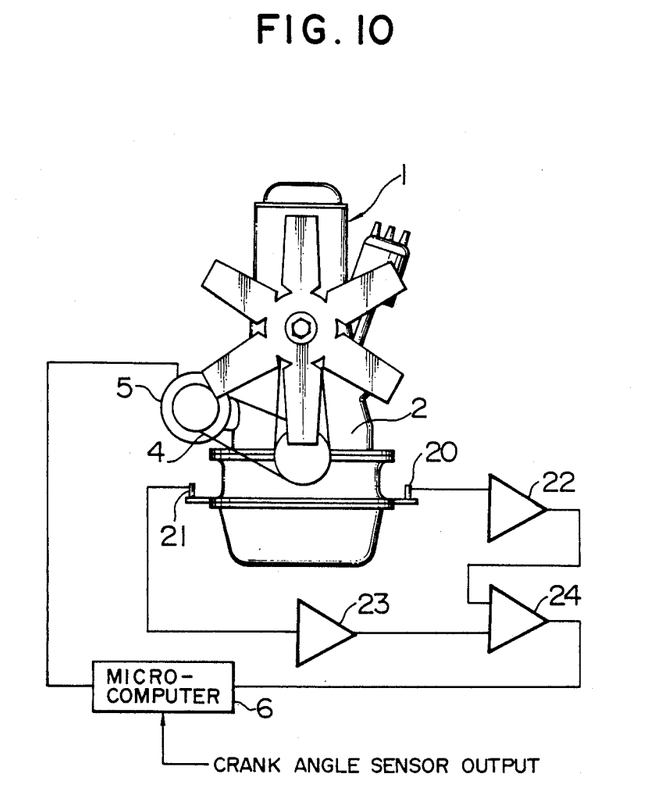
FIG. 10 is a schematic diagram showing the third embodiment of this invention.

FIG. 10 shows a third embodiment of this invention, in which the internal combustion engine 1 is provided as a varying torque sensing means with a pair of acceleration pickups 20 and 21 which detect the vertical vibration of the engine unit 2 by being mounted at positions in the same distance from the crankshaft on the horizontal line passing through the crankshaft center. The pickups 20 and 21 have their output signals amplified by respective pre-amplifiers 22 and 23, and then the difference of the signals is amplified by a differential amplifier 24. This process cancels the vertical vibration components of the pickup outputs, and extracts a rotational vibration component. The rotational vibration signal is processed by the microcomputer 6, which operates on the a.c. generator 5 in the same manner as of the first embodiment, and the torque variation and vibration of the engine unit 2 is alleviated.

Figure 11:
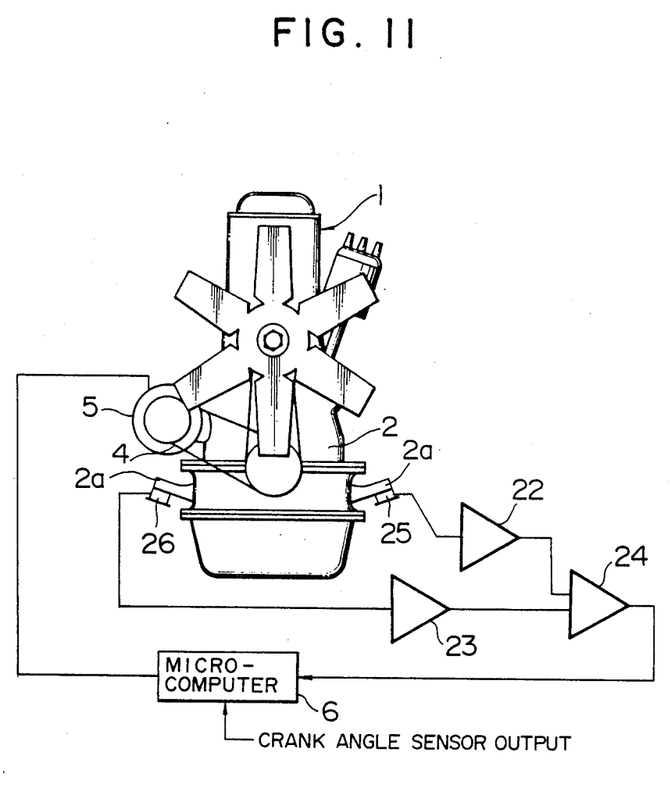
FIG. 11 is a schematic diagram showing the fourth embodiment of this invention.

FIG. 11 shows the fourth embodiment of this invention, in which the internal combustion engine 1 is provided as a varying torque sensing means with at least two piezoelectric load sensors 25 and 26 fitted between the engine mount (not shown) and fixtures 2a of the engine unit 2 and in positions symmetrical with respect to the crankshaft center. The load sensors 25 and 26 have their output signals processed by pre-amplifiers 22 and 23, and only a component proportional to the varying torque is extracted by a differential amplifier 24, as in the case of the third embodiment, and it is used by the microcomputer 6 for controlling the field current of the a.c. generator 5.

The locations of the acceleration pickups 20 and 21 in the third embodiment and the load sensors 25 and 26 in the fourth embodiment are not confined to symmetrical positions on the crankshaft center line, but their locations can be chosen arbitrarily in unison with the selection of amplification of the pre-amplifiers 22 and 23.

When the inventive internal combustion engine is applied to the automobile engine, it becomes possible to prevent the instability of maneuverability and lack of ride comfort which are caused by torsional vibration such as "surge" or "stumble" by which the vehicle speed varies abruptly, and also reduce the interior noise which is caused by the vibration of the whole vehicle derived from the engine through the engine mount.

We claim:

1. A torque controller apparatus for an internal combustion engine which includes a main power transmission system and an auxiliary machinery drive transmission, said engine produces a varying torque on a crank shaft connected between said main power transmission and said auxiliary machinery drive transmission, said crank shaft rotates through a plurality of crankangles, said torque controller apparatus comprising:

varying torque detecting means for detecting said varying torque at each crankangle of said crankshaft and supplying a varying torque signal;

differential torque calculating means for calculating a differential torque by subtracting said varying torque signal from an average value of said varying torque signal and supplying a differential torque signal, said average value of said varying torque signal being obtained by averaging data representative of varying torque signals collected over a plurality of previous cycles of said engine;

load torque determining means for determining a load torque absorbed by said auxiliary machinery at each crankangle of said crank shaft by adding said differential torque signal to an average load torque absorbed by said auxiliary machine and supplying a load torque signal; and load torque controller means for controlling said load torque absorbed by said auxiliary machinery at each crankangle of said crankshaft in response to said load torque signal.

2. A torque controller apparatus according to claim 1, wherein said load torque controller means controls said load torque at each crankangle of said crankshaft in response to a corresponding load torque signal of a previous cycle of said engine.

3. A torque controller apparatus according to claim 1, wherein said load torque controller means controls said load torque at each crankangle of said crankshaft in response to an average load torque signal wherein said average load torque signal is calculated by averaging data representative of load torque signals collected over a plurality of previous cycles of said engine.

4. A torque controller apparatus according to claim 1, wherein, said internal combustion engine has a plurality of cylinders, wherein a varying torque of each cylinder within one cycle of said engine is identical among all the cylinders and said varying torque of each cylinder occurs at intervals within a cycle of said engine, each interval being regarded as a period of total varying torque for all cylinders, and wherein said load torque controller means operates to control the load torque of said auxiliary machinery at each crankangle of said crankshaft in response to said load torque signal.

5. A torque controller apparatus according to claim 1, wherein said load torque controller means includes a varying rotational a speed sensor for detecting a varying rotational speed of said crankshaft, an arithmetic operation unit which calculates a load torque control value for said auxiliary machinery from said varying rotational speed and said load torque absorbed by said auxiliary machinery, a memory unit for storing load torque control data representative of said load torque control value calculated by said arithmetic operation unit, and a load torque control unit which retrieves said load torque control data from said memory unit and controls the load torque absorbed by said auxiliary machinery.

6. A torque controller apparatus according to claim 1, wherein said auxiliary machinery comprises an electric power generator, said load torque being caused to increase by increasing an output current of said generator in response to an increase in said varying torque output by said engine and said load torque being caused to decrease by decreasing the output current of said generator in response to a decrease in said varying torque output by said engine.

7. A torque controller apparatus according to claim 1 wherein said engine imparts a rotational speed to said crankshaft and said varying torque is directly proportional to said rotational speed of said crankshaft.

8. A torque controller apparatus according to claim 7, wherein said varying torque detecting means detects the rotational speed of said crankshaft and supplies a varying torque signal directly proportional to said rotational speed of said crankshaft.

9. A torque controller apparatus according to claim 1, wherein said differential torque signal is an analog signal.

10. A torque controller apparatus according to claim 1, wherein said crankangles are predetermined angles of rotation of said crankshaft.

11. An internal combustion engine comprising:
an engine unit which rotationally drives a crank shaft through a plurality of crankangles by outputting a varying drive torque on said crank shaft;
an auxiliary machinery coupled to sand crankshaft such that said auxiliary machinery is driven by said engine unit;
crankangle detecting means for detecting each crankangle of said crankshaft and supplying a crankangle signal; and
a load torque controller including differential torque detecting means for detecting at each crankangle of said crankshaft a differential torque applied to said crankshaft in response to said crankangle signal supplied by said crankangle detecting means, said differential torque detecting means detects said differential torque by calculating a difference between said varying drive torque output by said engine unit on said crankshaft and an average torque output by said engine unit, said average torque being obtained by averaging data representative of varying drive torques collected over a plurality of previous cycles of said engine, said differential torque detecting means supplies a differential torque signal, and load torque control means for controlling said load torque absorbed by said auxiliary machinery at each crankangle of said crankshaft in response to said differential torque signal supplied by said differential torque detecting means and said crankangle signal supplied by said crankangle detecting means, said load torque control means controls said load torque absorbed by said auxiliary machinery such that said differential torque is made to become zero.

12. An internal combustion engine according to claim 11, wherein said differential torque detecting means calculates said differential torque by calculating a differential between a rotational speed of said crankshaft at a crankangle and an average rotational speed of said crankshaft taken over one cycle of said engine unit.

13. An internal combustion engine according to claim 11, wherein said load torque controller further includes:
arithmetic operation unit which calculates a load torque control value for said auxiliary machinery in response to said differential torque signal supplied by said differential torque detecting means;
said load torque control means retrieves a load torque control value stored in said memory unit in correspondence to a crank angle signal supplied by said crank angle detecting means, and operates on said auxiliary machinery to control said load torque absorbed by said auxiliary machinery.

14. An internal combustion engine comprising:
an engine unit which rotationally drives a crank shaft through a plurality of crankangles by outputting a varying torque on said crank shaft;
an auxiliary machinery coupled to said crank shaft such that said auxiliary machinery is driven by said engine unit;
instantaneous torque detecting means for detecting an instantaneous torque generated by said engine unit on said crank shaft, and supplying an instantaneous torque signal, said instantaneous torque being detected over at least one cycle of said engine;
differential torque calculating means for calculating a differential torque by subtracting said instantaneous torque signal from an average value of torque generated by said engine unit on said crank shaft and supplying a differential torque signal, said average value of torque being obtained by averaging data representative of instantaneous torque signals collected over a plurality of previous cycles of said engine;
load torque determining means for determining a load torque absorbed by said auxiliary machinery and supplying a load torque signal; and
load torque controller means for controlling said load torque absorbed by said auxiliary machinery by causing said load torque signal to approximate an inverse of said differential torque signal.

15. A torque controller apparatus for an internal combustion engine which operates through a plurality of cycles and includes a main power transmission system and an auxiliary machinery drive transmission, said engine produces a varying torque on a crank shaft connected between said main power transmission and said auxiliary machinery drive transmission, said crank shaft rotate through a plurality of crankangles each cycle of said engine, said torque controller apparatus comprising:

varying torque detecting means for detecting said varying torque at each crankangle of said crankshaft and supplying a varying torque signal;

differential torque calculating means for calculating a differential torque by subtracting said varying torque signal from an average value of said varying torque signal and supplying a differential torque signal, said average value of said varying torque signal being obtained by averaging data representative of varying torque signals collected over a plurality of previous cycles of said engine;

load torque determining means for determining a load torque absorbed by said auxiliary machinery at each crankangle of said crank shaft by adding said differential torque signal to an average load torque absorbed by said auxiliary machinery and supplying a load torque signal; and load torque controller means for controlling said load torque absorbed by said auxiliary machinery at each crankangle of said crank shaft in response to a load torque signal of a previous cycle of said engine.

* * * * *